United States Patent
Horen

(10) Patent No.: US 10,844,941 B2
(45) Date of Patent: Nov. 24, 2020

(54) TORQUE CONVERTER ONE-WAY FLOW DEVICE AND METHOD TO ENABLE LOCKUP CLUTCH APPLICATION

(71) Applicant: Allison Transmission, Inc., Indianapolis, IN (US)

(72) Inventor: Jezrah E. Horen, Fairland, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 108 days.

(21) Appl. No.: 16/300,440

(22) PCT Filed: May 16, 2017

(86) PCT No.: PCT/US2017/032809
§ 371 (c)(1),
(2) Date: Nov. 9, 2018

(87) PCT Pub. No.: WO2017/200982
PCT Pub. Date: Nov. 23, 2017

(65) Prior Publication Data
US 2019/0178357 A1    Jun. 13, 2019

Related U.S. Application Data

(60) Provisional application No. 62/336,910, filed on May 16, 2016.

(51) Int. Cl.
*F16H 45/02*    (2006.01)
*F16D 25/12*    (2006.01)
(Continued)

(52) U.S. Cl.
CPC .......... *F16H 45/02* (2013.01); *F16D 25/0635* (2013.01); *F16D 25/12* (2013.01); *F16H 61/14* (2013.01); *F16H 2045/0215* (2013.01)

(58) Field of Classification Search
CPC .. F16H 45/02; F16H 61/14; F16H 2045/0215; F16H 2045/0205–0294;
(Continued)

(56) References Cited

U.S. PATENT DOCUMENTS 4,333,552 A * 6/1982 LaMarche ............... F16H 45/02
137/326
4,986,397 A    1/1991 Vierk
(Continued)

FOREIGN PATENT DOCUMENTS

EP    1079147 A2    2/2001
JP    53-32264    *    3/1978

OTHER PUBLICATIONS

Machine language translation of JP-53-32264.*
(Continued)

*Primary Examiner* — Mark A Manley
(74) *Attorney, Agent, or Firm* — Faegre Drinker Biddle & Reath LLP

(57) ABSTRACT

A torque converter having a pump, a turbine, and a lockup clutch assembly with a piston and a clutch plate. The lockup clutch assembly is capable of balancing pressure on opposing sides of the lockup clutch assembly to facilitate application of the lockup clutch assembly, in particular during an overrun condition in which the turbine rotates faster than the pump.

22 Claims, 10 Drawing Sheets

(51) Int. Cl.
*F16H 61/14* (2006.01)
*F16D 25/0635* (2006.01)

(58) Field of Classification Search
CPC ...... F16D 25/12; F16D 25/14; F16D 25/0635; F16D 2125/06
See application file for complete search history.

(56) References Cited

U.S. PATENT DOCUMENTS

| | | | |
|---|---|---|---|
| 6,062,358 | A | 5/2000 | Otto et al. |
| 7,992,694 | B2 | 8/2011 | Krause et al. |
| 8,348,037 | B2 | 1/2013 | Carrier et al. |
| 2005/0211523 | A1 | 9/2005 | Takahashi |
| 2006/0207851 | A1 | 9/2006 | Heuler et al. |
| 2008/0308374 | A1* | 12/2008 | Heukelbach ............ F16H 45/02 192/3.25 |
| 2015/0345604 | A1 | 12/2015 | Boley |
| 2016/0017971 | A1 | 1/2016 | Sayre et al. |

OTHER PUBLICATIONS

Patent Cooperation Treaty, International Search Report and Written Opinion for PCT/US2017/032809 to Allison Transmission, Inc., dated Aug. 21, 2017, 17 pages.

\* cited by examiner

TORQUE CONVERTER ONE-WAY FLOW DEVICE AND METHOD TO ENABLE LOCKUP CLUTCH APPLICATION

CROSS REFERENCE TO RELATED APPLICATION

The present application is a national stage application of PCT Application No. PCT/US2017/032809 filed May 16, 2017, which claims priority to U.S. provisional Ser. No. 62/336,910 filed May 16, 2016, the subject matters of which are incorporated herein by reference.

FIELD OF THE DISCLOSURE

The present disclosure relates to a torque converter. More particularly, the present disclosure relates to a lockup clutch assembly of the torque converter and to a method for using the same.

BACKGROUND OF THE DISCLOSURE

A torque converter can transfer power from a prime mover, such as an internal combustion engine or an electric motor, to a transmission and an output. In motor vehicle applications, the output may be the wheels or tracks of a drivetrain. In stationary applications, the output may be a pump, wench, auger, or another output. The torque converter includes an upstream pump (i.e., impeller) coupled to a drive shaft of the prime mover and a downstream turbine coupled to a driven shaft of the transmission.

The torque converter also includes a lockup clutch assembly to facilitate different modes of operation, namely a converter mode and a lockup mode. The lockup clutch assembly may include a piston and a clutch plate. In the converter mode, the piston does not engage the clutch plate, and the transmission is coupled to the engine via a fluid coupling between the turbine and the pump. In the lockup mode, the piston frictionally engages the clutch plate, and the transmission is coupled to the engine via this frictional coupling, bypassing the previously-described fluid coupling.

In certain operating conditions, such as an overrun operating condition, a pressure imbalance may develop on opposing sides of the piston. During the overrun operating condition, the transmission and the turbine rotate faster than the prime mover and the pump, such as when a vehicle is rolling down a hill. The pressure imbalance on the piston may hinder application of the lockup clutch assembly, specifically movement of the piston toward the clutch plate. As a result, the lockup clutch assembly may be applied sluggishly or not at all.

SUMMARY

The present disclosure provides a torque converter having a pump, a turbine, and a lockup clutch assembly with a piston and a clutch plate. The lockup clutch assembly is capable of balancing pressure on opposing sides of the lockup clutch assembly to facilitate application of the lockup clutch assembly, in particular during an overrun condition in which the turbine rotates faster than the pump.

According to an embodiment of the present disclosure, a torque converter is disclosed that is configured to couple a prime mover to a transmission. The torque converter includes a pump, a turbine, and a lockup clutch assembly configured to selectively couple the pump and the turbine. The lockup clutch assembly includes a clutch, a piston with a first side configured to engage the clutch and an opposing second side, the first side of the piston facing a first fluid cavity and the second side of the piston facing a second fluid cavity, and at least one fluid passageway between the first fluid cavity and the second fluid cavity, wherein the fluid passageway is a one-way passageway that permits fluid flow from the first fluid cavity to the second fluid cavity and blocks fluid flow from the second fluid cavity to the first fluid cavity.

According to another embodiment of the present disclosure, a torque converter is disclosed that is configured to couple a prime mover to a transmission. The torque converter includes a pump, a turbine, and a lockup clutch assembly configured to selectively couple the pump and the turbine. The lockup clutch assembly includes a clutch, a piston moveable in a first direction away from the clutch and a second direction toward the clutch, and at least one fluid passageway that is capable of opening to permit fluid flow in the first direction when the piston moves in the second direction.

According to yet another embodiment of the present disclosure, a method is provided for operating a lockup clutch assembly of a torque converter, the lockup clutch assembly including a clutch and a piston. The method includes moving the piston away from the clutch by introducing fluid to a first fluid cavity on a first side of the piston, and moving the piston toward the clutch by introducing fluid to a second fluid cavity on a second side of the piston and opening at least one fluid passageway from the first fluid cavity to the second fluid cavity.

According to still yet another embodiment of the present disclosure, a torque converter is disclosed that is configured to couple a prime mover to a transmission, the torque converter including: a first rotatable assembly including a pump, the first rotatable assembly adapted to be coupled to the prime mover; a second rotatable assembly including a turbine, the second rotatable assembly adapted to be coupled to the transmission; a lockup clutch assembly having a first sub-assembly carried by one of the first rotatable assembly and the second rotatable assembly and a second sub-assembly carried by the other of the first rotatable assembly and the second rotatable assembly, the lockup clutch assembly having a first configuration wherein the first sub-assembly is disengaged from the second sub-assembly and a second configuration wherein the first sub-assembly is engaged with the second sub-assembly; the first sub-assembly including a clutch and the second sub-assembly including a piston and a one-way passageway to selectively permit fluid flow from a first side of the second sub-assembly to a second side of the second sub-assembly.

BRIEF DESCRIPTION OF THE DRAWINGS

The above-mentioned and other features and advantages of this disclosure, and the manner of attaining them, will become more apparent and will be better understood by reference to the following description of exemplary embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
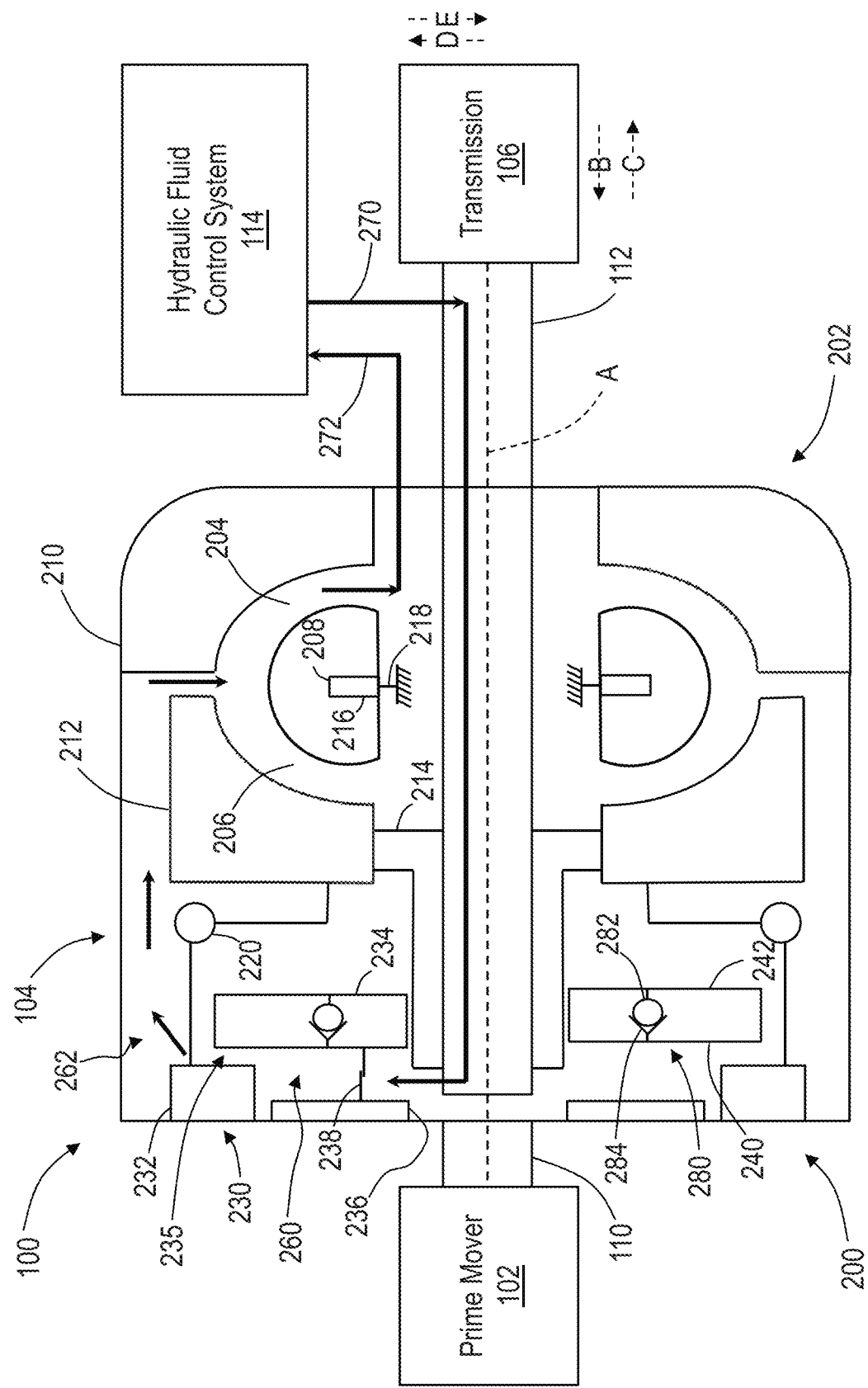
FIG. 1 is a schematic view of a motor vehicle including a prime mover, a torque converter, and a transmission, wherein the torque converter is shown in a converter mode.

FIG. 1 is a schematic representation of a motor vehicle 100 having a prime mover 102, such as an internal combustion engine or an electric motor, a torque converter 104, and a transmission 106 configured to power a drivetrain or another output (not shown). Torque converter 104 is coupled to a drive shaft 110 of prime mover 102 and a driven shaft 112 of transmission 106. In operation, torque converter 104 transfers power from drive shaft 110 of prime mover 102 to driven shaft 112 of transmission 106 via a fluid or mechanical coupling. The fluid or mechanical coupling may be controlled by a hydraulic fluid control system 114, as described further below.

Referring still to FIG. 1, torque converter 104 has a front end 200, a rear end 202, and a longitudinal axis of rotation A extending therebetween. Front end 200 of torque converter 104 faces prime mover 102, and rear end 202 of torque converter 104 faces transmission 106. The illustrative torque converter 104 is arranged circumferentially about axis A. For purposes of orientation in FIG. 1, a first arrow B is shown extending in an axially forward direction along axis A, a second arrow C is shown extending in an axially rearward direction along axis A, a third arrow D is shown extending in a radially outward direction from axis A, and a fourth arrow E is shown extending in a radially inward direction toward axis A.

Referring still to FIG. 1, torque converter 104 includes a pump 204 (i.e., impeller), a turbine 206, and a stator 208 disposed axially between pump 204 and turbine 206. Pump 204 is coupled to prime mover 102 for rotation therewith via an outer housing 210 (i.e., case) that is coupled to drive shaft 110 of prime mover 102. In certain embodiments, a flywheel (not shown) on drive shaft 110 of prime mover 102 is coupled (e.g., bolted) to front end 200 of outer housing 210. Turbine 206 is coupled to transmission 106 for rotation therewith via an inner housing 212 (i.e., shell) and a hub 214 that receives driven shaft 112 of transmission 106, such as in a splined relationship. Stator 208 includes a hub 216 that receives a grounded stator shaft 218, such as in a splined relationship.

Torque converter 104 also includes a damper assembly 220 disposed axially forward of turbine 206. Damper assembly 220 includes one or more springs 222 and a spring retainer 224 (FIG. 4) coupled (e.g., riveted) to inner housing 212 of turbine 206 for rotation therewith. More information regarding damper assembly 220 is set forth in U.S. Patent Application Publication No. 2015/0053528, the disclosure of which is expressly incorporated herein by reference in its entirety.

Torque converter 104 further includes a lockup clutch assembly 230 disposed axially forward of turbine 206 and damper assembly 220. Lockup clutch assembly 230 includes a clutch plate 232, which may also be referred to more generally as a clutch, and a piston 234. In the illustrated embodiment of FIG. 1, clutch plate 232 is coupled to inner housing 212 and turbine 206 for rotation therewith. More specifically, clutch plate 232 is coupled to inner housing 212 and turbine 206 via damper assembly 220. Clutch plate 232 may have one or more roughened or frictional surfaces. In the same illustrated embodiment of FIG. 1, piston 234 is coupled to outer housing 210 and pump 204 for rotation therewith. More specifically, piston 234 is coupled to outer housing 210 and pump 204 via an intermediate drive plate 236 that is coupled (e.g., riveted) to outer housing 210 on one side and spring-coupled to piston 234 on the other side via spring leaves 238, for example. Piston 234 is disposed axially between damper assembly 220 and clutch plate 232 and is configured to move axially therebetween across hub 214, as discussed further below.

Piston 234 includes a front side 240 and an opposing rear side 242. Front side 240 of piston 234 faces axially forward toward prime mover 102, so this front side 240 may also be referred to as the "engine side" of piston 234. Rear side 242 of piston 234 faces axially rearward toward transmission 106, so this rear side 242 may also be referred to as the "transmission side" of piston 234.

Piston 234 divides the interior of torque converter 104 into a first fluid cavity 260 and a second fluid cavity 262. First fluid cavity 260 is bordered by front side 240 of piston 234, and second fluid cavity 262 is bordered by rear side 242 of piston 234. The illustrative torque converter 104 is a "two-pass" system having two fluid passageways—a first fluid passageway 270 that extends through driven shaft 112 of transmission 106 and communicates with first fluid cavity 260, and a second fluid passageway 272 that extends through or adjacent to stator 208 and communicates with second fluid cavity 262. In this arrangement, the fluid from first fluid passageway 270 rotates at the same speed as transmission 106, and the fluid from second fluid passageway 272 rotates at the same speed as prime mover 102.

Lockup clutch assembly 230 enables torque converter 104 to operate in different modes, namely a converter mode and a lockup mode. Each of these modes is described further below.

The converter mode is shown in FIG. 1 with piston 234 disengaged from clutch plate 232. Piston 234 may be biased in this position via spring leaves 238. In this converter mode, control system 114 directs fluid (e.g., oil) through first fluid passageway 270 and into first fluid cavity 260. The fluid experiences a pressure drop as it travels through a gap 235 between clutch plate 232 and piston 234 and into second fluid cavity 262. This fluid flow path from first fluid cavity 260 to second fluid cavity 262 across piston 234 forces piston 234 axially rearward and away from clutch plate 232. The fluid may be exhausted from second fluid cavity 262 via second fluid passageway 272.

When prime mover 102 rotates in the converter mode of FIG. 1, the rotation is transferred mechanically from prime mover 102, to outer housing 210, and to pump 204. The rotation of pump 204 directs the fluid in second fluid cavity 262 across to turbine 206, thereby creating a fluid coupling between pump 204 and turbine 206. The rotation of turbine 206 is then transferred mechanically to inner housing 212, to hub 214, and to driven shaft 112 of transmission 106. Overall, the converter mode creates a fluid coupling between prime mover 102 and transmission 106.

Figure 3:
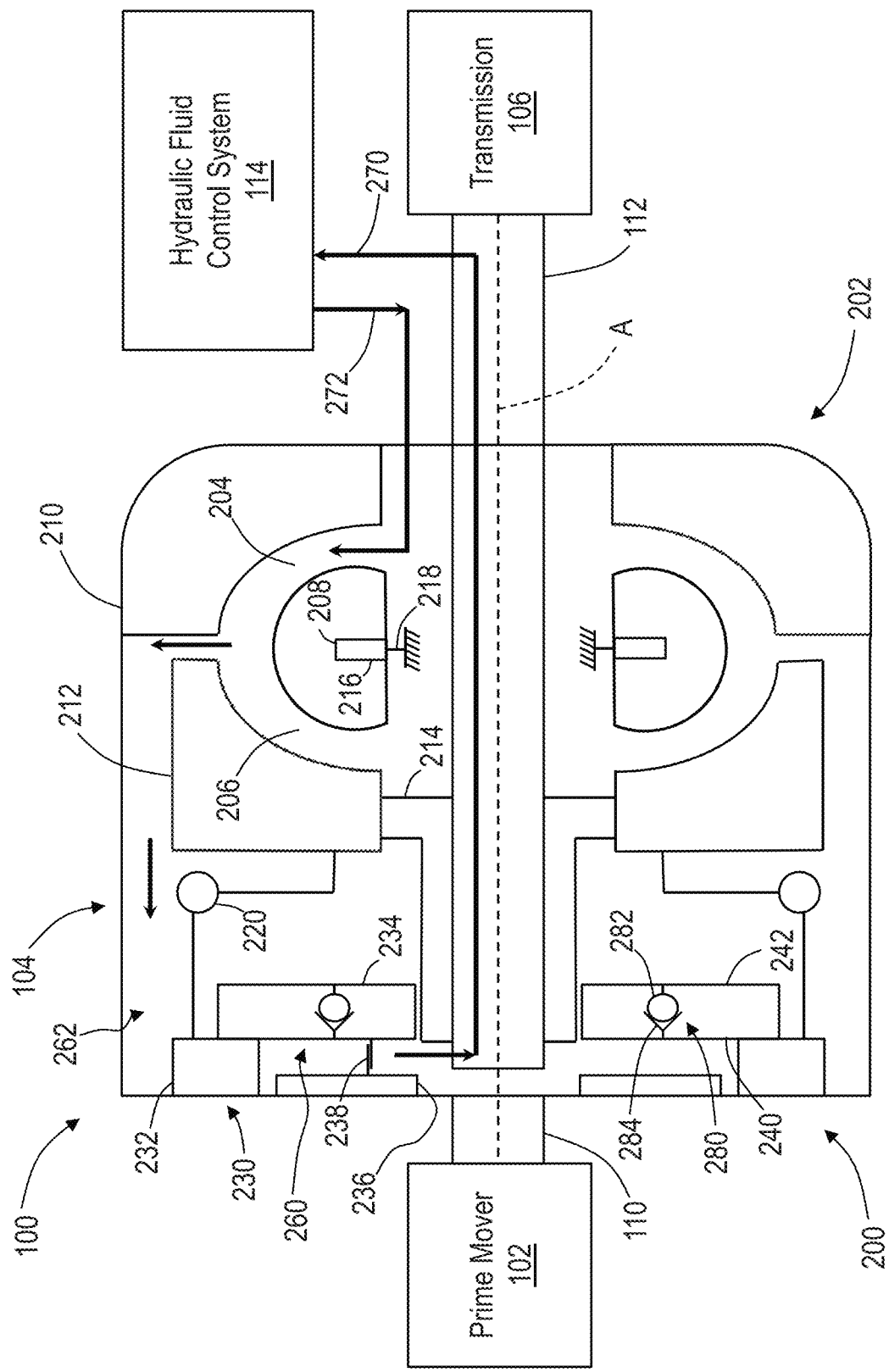
FIG. 3 is another schematic view of the motor vehicle of FIG. 1, wherein the torque converter is shown in the lockup mode.

The lockup mode is shown in FIG. 3 with piston 234 moved axially forward to frictionally engage clutch plate 232 between piston 234 and outer housing 210. In this lockup mode, control system 114 reverses the fluid flow and directs fluid through second fluid passageway 272 and into second fluid cavity 262. As piston 234 approaches clutch plate 232, the fluid experiences an increasing pressure drop as it travels through the shrinking gap 235 between clutch plate 232 and piston 234 and into first fluid cavity 260. The differential pressure between second fluid cavity 262 and first fluid cavity 260 across piston 234 generates an axially forward force, forcing piston 234 axially forward toward clutch plate 232. When piston 234 eventually engages clutch plate 232, as shown in FIG. 3, the fluid flow path across piston 234 through gap 235 closes. However, the pressure in second fluid cavity 262 builds up to maintain the engagement between piston 234 and clutch plate 232. The fluid may be exhausted from first fluid cavity 260 via first fluid passageway 270.

When prime mover 102 rotates in the lockup mode of FIG. 3, the rotation is transferred mechanically from prime mover 102, to drive plate 236, and to piston 234. The rotation of piston 234 is transferred to the frictionally-engaged clutch plate 232 and to inner housing 212 of turbine 206 via damper assembly 220. Like the above-described converter mode, the rotation of inner housing 212 is then transferred mechanically to hub 214 and to driven shaft 112 of transmission 106. Overall, the converter mode creates a mechanical coupling between prime mover 102 and transmission 106. During this lockup mode, springs 222 of damper assembly 220 may compress relative to spring retainer 224 (FIG. 4) to dampen torque loads between prime mover 102 and transmission 106.

In certain operating conditions, movement of piston 234 from the converter mode of FIG. 1 to the lockup mode of FIG. 3 may be hindered by a pressure imbalance on piston 234. Specifically, movement of piston 234 may be hindered by a higher pressure in first fluid cavity 260 that tends to resist application of lockup clutch assembly 230 (i.e., "resistance" pressure) and a lower pressure in second fluid cavity 262 that tends to apply lockup clutch assembly 230 (i.e. "application" pressure). Even if the application pressure in second fluid cavity 262 is increased, the higher resistance pressure in first fluid cavity 260 may resist movement of piston 234 toward clutch plate 232. As a result, lockup clutch assembly 230 may be applied sluggishly or not at all.

The pressure imbalance on piston 234 may develop during an overrun operating condition, in which turbine 206 and driven shaft 112 of transmission 106 rotate faster than pump 204 and prime mover 102, such as when vehicle 100 is rolling down a hill. In the illustrative torque converter 104, the fluid in second fluid cavity 262 would rotate with the faster-moving driven shaft 112 of turbine 206, and the fluid in first fluid cavity 260 would rotate with the slower-moving pump 204, which leads to higher forces in the slower-moving first fluid cavity 260 and lower forces in the faster-moving second fluid cavity 262 according to Bernoulli's principle. The differential pressure between second fluid cavity 262 and first fluid cavity 260 across piston 234 generates an axially rearward Bernoulli force, forcing piston 234 axially rearward away from clutch plate 232. This overrun operating condition may occur when lockup clutch assembly 230 is disengaged during a shift event and then re-engaged immediately after the shift, for example.

Figure 2:
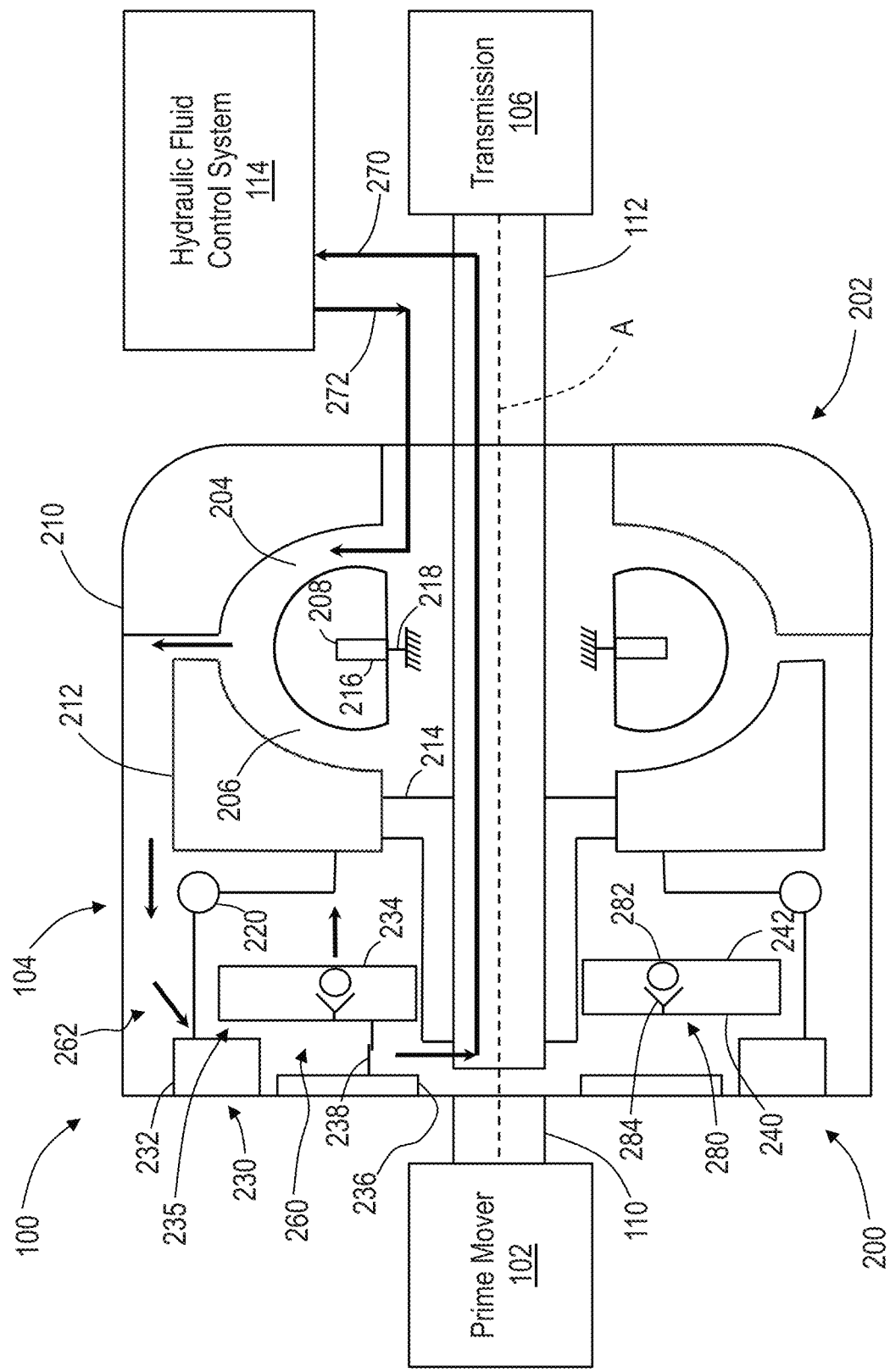
FIG. 2 is another schematic view of the motor vehicle of FIG. 1, wherein the torque converter is shown with one-way fluid passageways open to facilitate a lockup mode.

To overcome the pressure imbalance and facilitate movement of piston 234 from the converter mode of FIG. 1 to the lockup mode of FIG. 3, lockup clutch assembly 230 may include one or more one-way fluid passageways 280 from first fluid cavity 260 to second fluid cavity 262, as shown in FIG. 2. Each passageway 280 is associated with a one-way valve 282 that permits fluid flow from first fluid cavity 260 to second fluid cavity 262 but prevents reverse fluid flow from second fluid cavity 262 to first fluid cavity 260. In this embodiment, excess resistance pressure in first fluid cavity 260 escapes into second fluid cavity 262. Even at low resistance pressures, the fluid in first fluid cavity 260 may force one-way valve 282 away from valve seat 284 of piston 234, as shown in FIG. 2. With passageway 280 opened, the fluid from first fluid cavity 260 may travel axially rearward through piston 234 in a direction substantially parallel to axis A and into second fluid cavity 262 to combine with the fluid being introduced to second fluid cavity 262 through second fluid passageway 272. As a result, the resistance pressure in first fluid cavity 260 decreases and the application pressure in second fluid cavity 262 increases.

Returning to FIG. 3, the increased application pressure in second fluid cavity 262 may cause one-way valve 282 to close and block further flow through passageway 280. Also, the increased application pressure in second fluid cavity 262 may move piston 234 axially forward to engage clutch plate 232, thereby facilitating application of lockup clutch assembly 230. In this embodiment, piston 234 and the fluid that flows through piston 234 travel in opposite directions to accomplish the lockup mode. Lockup clutch assembly 230 of the present disclosure may be applied at turbine 206 overspeeds of about 300 RPM, 600 RPM, or more.

Figure 4:
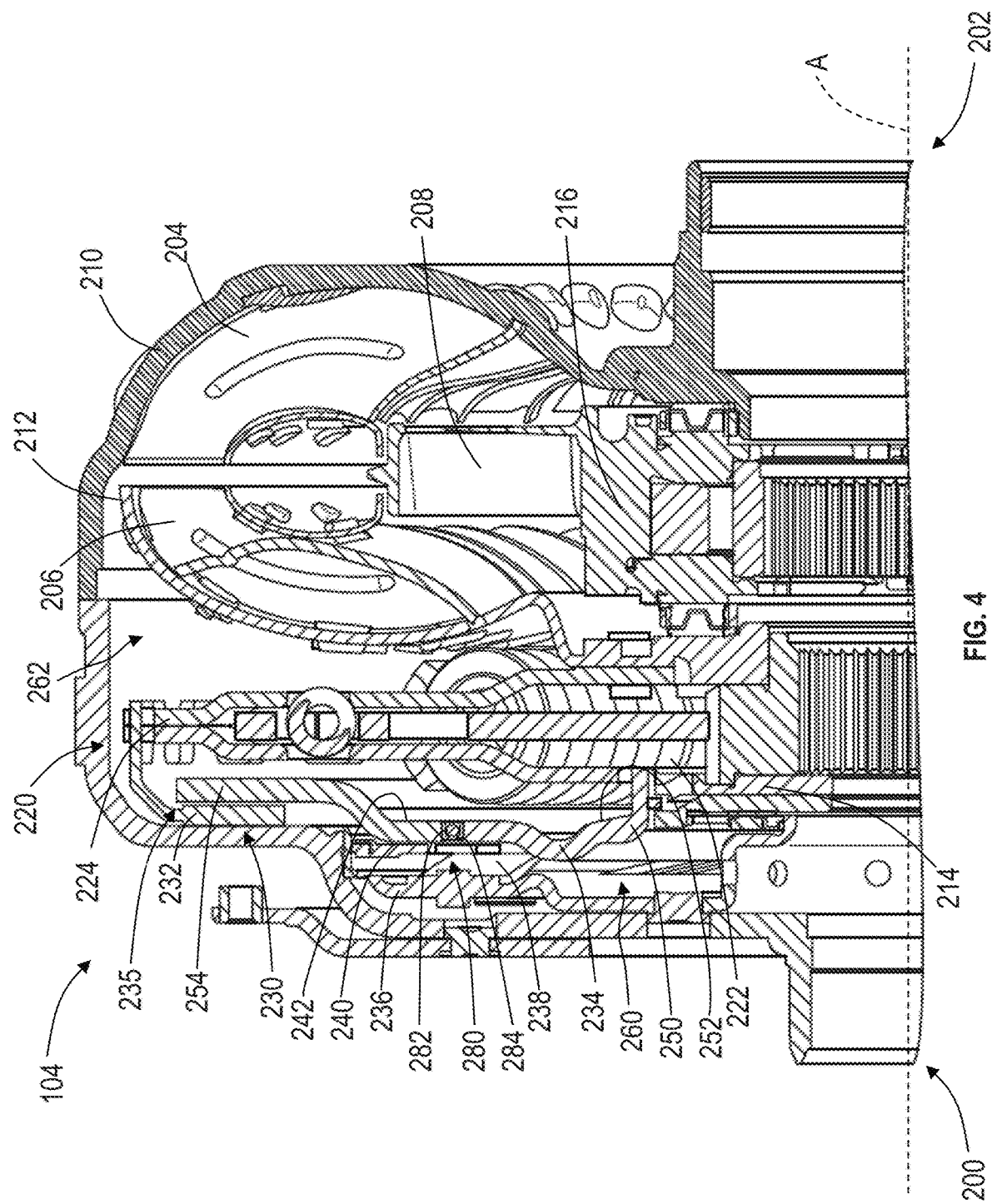
FIG. 4 is a partial cross-sectional view of an exemplary torque converter having a lockup clutch assembly including a piston and a clutch plate.
Figure 5:
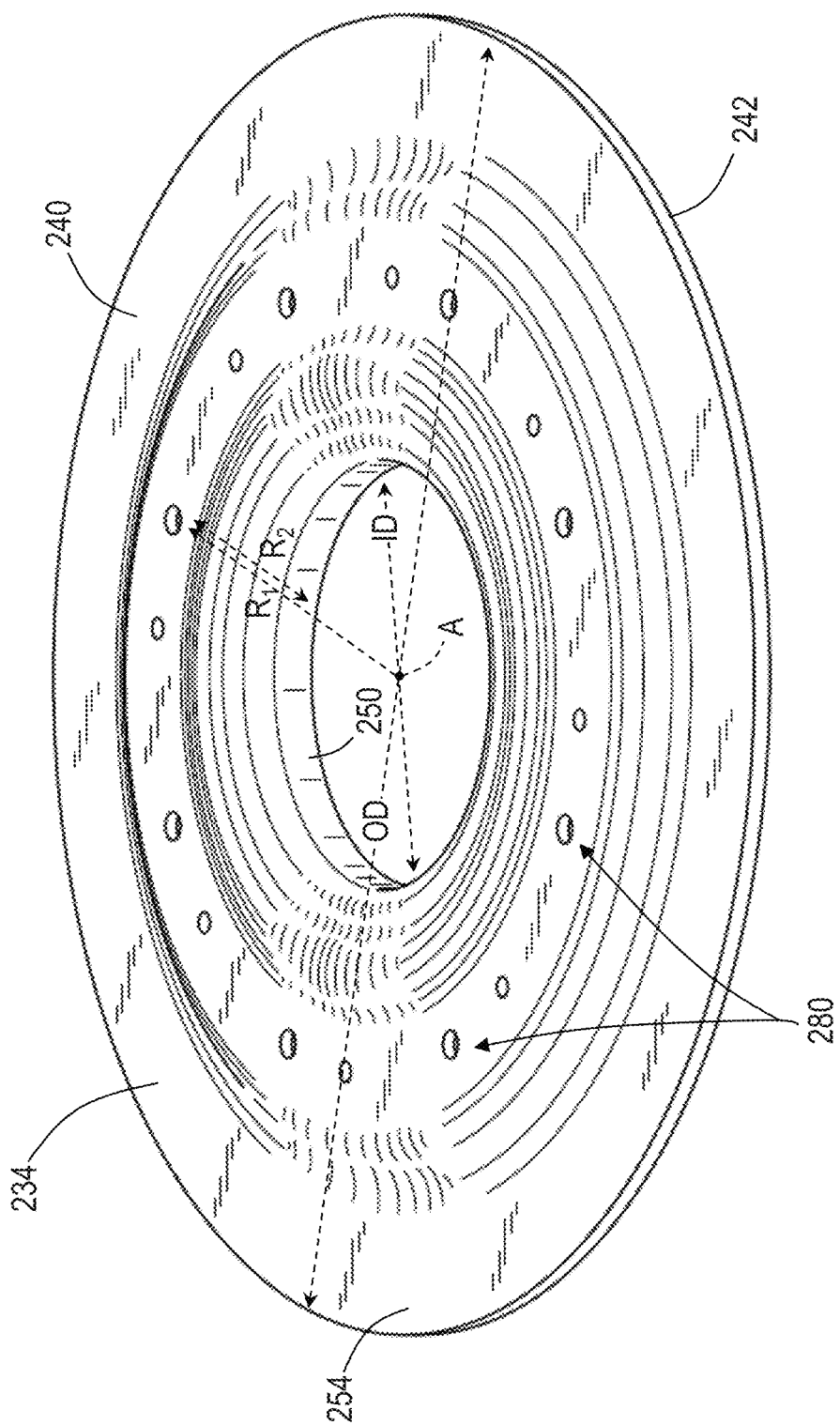
FIG. 5 is a perspective view of a first side of the piston of FIG. 4.
Figure 6:
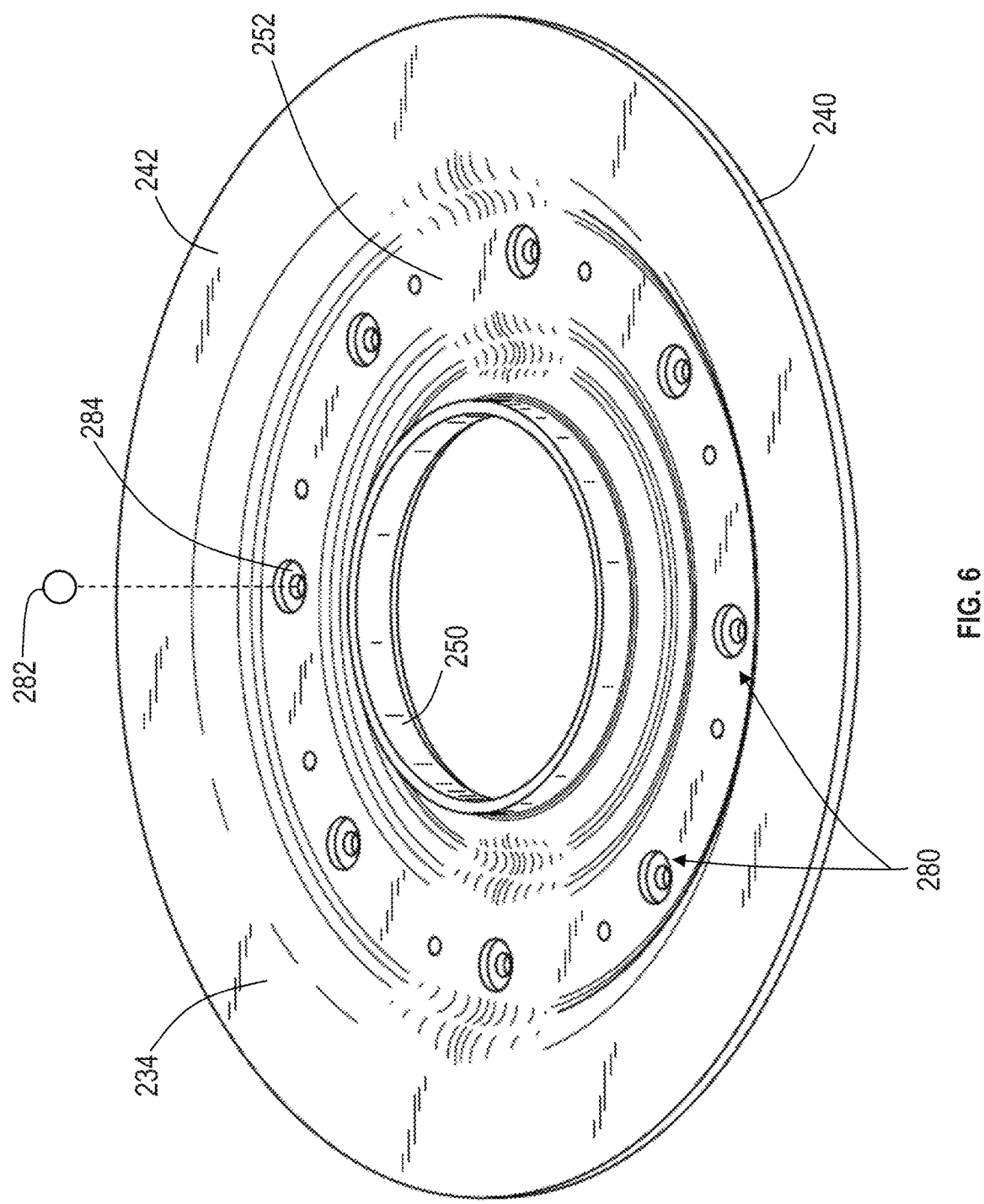
FIG. 6 is a perspective view of a second side of the piston of FIG. 4 opposite the first side.

An exemplary piston 234 is shown in FIGS. 4-6, wherein the illustrative passageways 280 are holes that extend through piston 234 from front side 240 to rear side 242, and the illustrative one-way valves 282 are ball valves configured to engage corresponding valve seats 284 in piston 234.

The illustrative piston 234 includes an inner rim 250, an intermediate recess 252 on rear side 242, and an outer clutch face 254 on front side 240. Inner rim 250 defines an inner diameter ID (FIG. 5) of piston 234 and is configured to slide axially relative to hub 214 of inner housing 212. Intermediate recess 252 on rear side 242 is configured to accommodate damper assembly 220. Outer clutch face 254 on front side 240 defines an outer diameter OD (FIG. 5) of piston 234 and is configured to selectively engage clutch plate 232.

The illustrative piston 234 also includes eight evenly spaced holes 280, but this number may vary. Holes 280 are positioned in intermediate recess 252, which may help maintain the structural integrity of piston 234 and avoid interference with inner rim 250 or outer clutch face 254, but this position may vary. Holes 280 are spaced the same radial distance $R_1$ from axis A and radial distance $R_2$ from inner diameter ID, which may be approximately halfway between inner diameter ID and outer diameter OD of piston 234. Depending on the size and shape of piston 234, radial distance $R_2$ from inner diameter ID may be about 0.06 to 0.12 m, more specifically about 0.08 to 0.10 m, and even more specifically about 0.09 m, for example. Alternatively, holes 280 could be staggered around piston 234, with some holes 280 being radially closer to inner diameter ID and other holes being radially closer to outer diameter OD. The diameter of each hole 280 may also vary from about 1 to 20 mm, more specifically about 2 to 10 mm, and even more specifically about 4 to 6 mm, for example.

Although the illustrative passageways 280 are formed in piston 234, it is also within the scope of the present disclosure that passageways 280 may be located in other areas of torque converter 104, such as hub 214 of inner housing 212. Also, although the illustrative one-way valves 282 are ball valves, it is also within the scope of the present disclosure that one-way valves 282 may include reed valves or other suitable one-way or check valves. Furthermore, although the illustrative one-way valves 282 are directly operated by the pressure in first fluid cavity 260, it is also within the scope of the present disclosure that one-way valves 282 may be controlled electrically, hydraulically, or using pitot tubes, for example.

Advantageously, passageways 280 of the present disclosure may eliminate the need for high-force seals and/or weldments along inner diameter ID and outer diameter OD of piston 234. Eliminating such seals and/or weldments may decrease the time and costs associated with manufacturing and servicing torque converter 104. Also, eliminating such seals and/or weldments may reduce friction surfaces in torque converter 104, thereby decreasing stresses and improving the capacity of torque converter 104.

EXAMPLE

Figure 7:
FIGS. 7 and 8 show the results of an overrun simulation on a first piston lacking one-way fluid passageways, wherein the results are presented in a pressure contour diagram in FIG. 7 and in a graph in FIG. 8.
Figure 8:
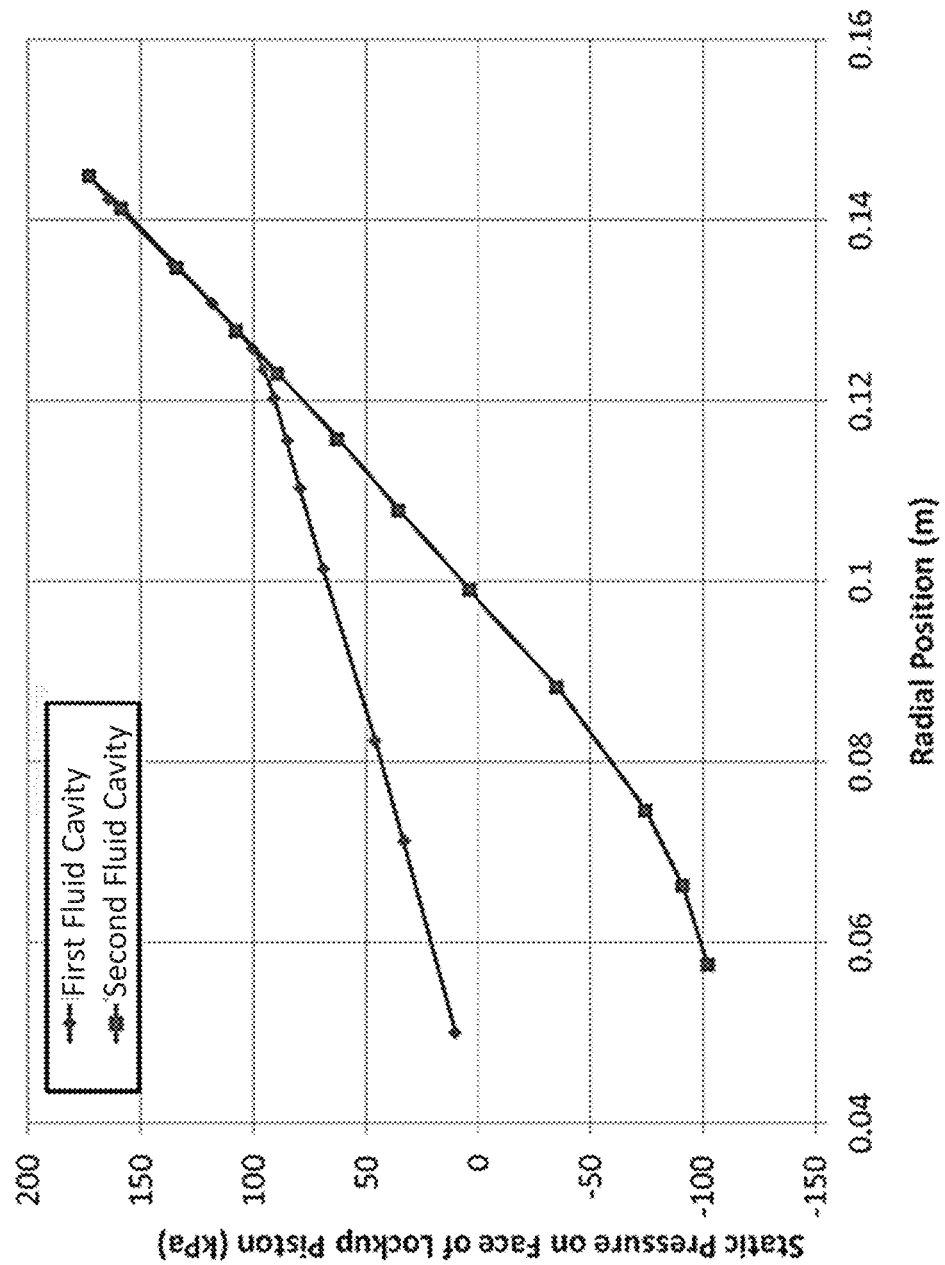

As shown in FIGS. 7 and 8, a first piston was subjected to an overrun simulation at 1000 RPM pump speed and 600 RPM turbine overspeed. The first piston lacked one-way passageways through the piston. In a radially outward direction, the resistance pressure in the first fluid cavity and the application pressure in the second fluid cavity both increased due to centrifugal forces. At most radial positions, the resistance pressure in the first fluid cavity exceeded the application pressure in the second fluid cavity. Overall, there was about 3,800 N of net force on the piston resisting application of the lockup clutch assembly.

Figure 9:
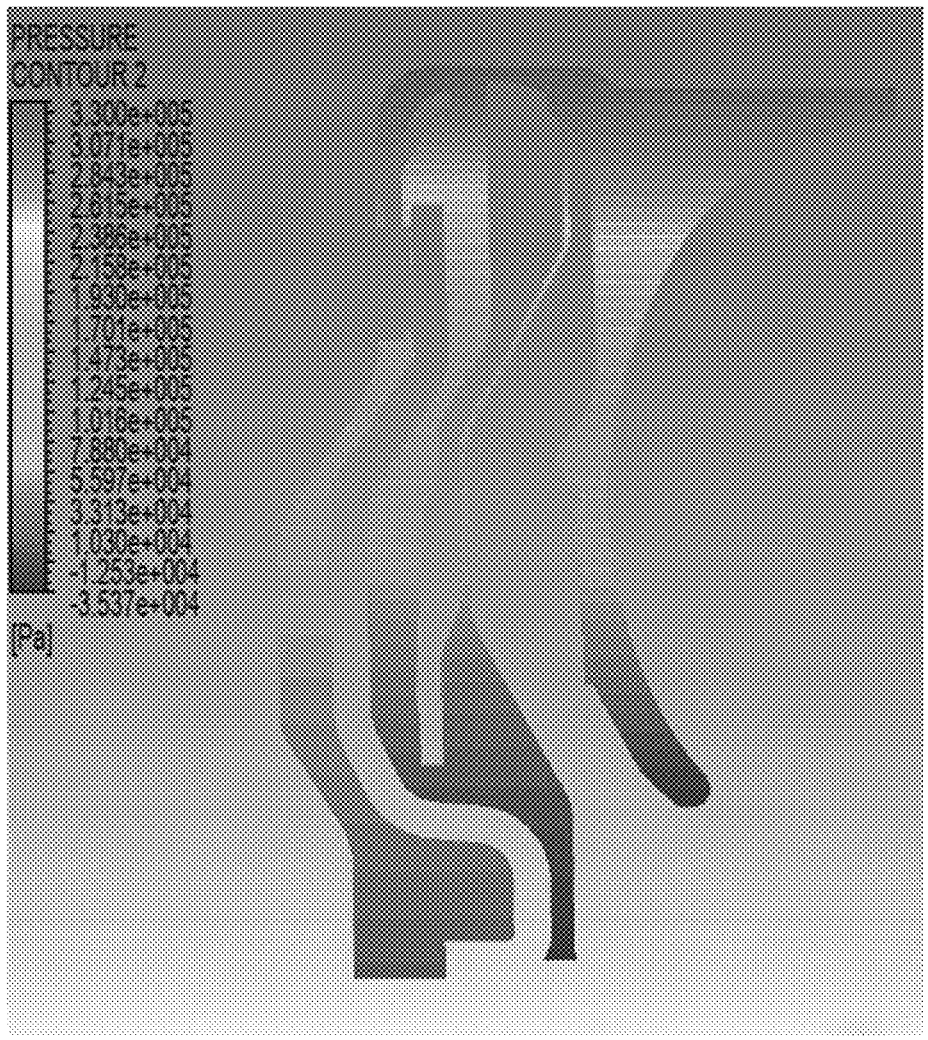
FIGS. 9 and 10 show the results of an overrun simulation on a second piston having one-way fluid passageways, wherein the results are presented in a pressure contour diagram in FIG. 9 and in a graph in FIG. 10.
Figure 10:
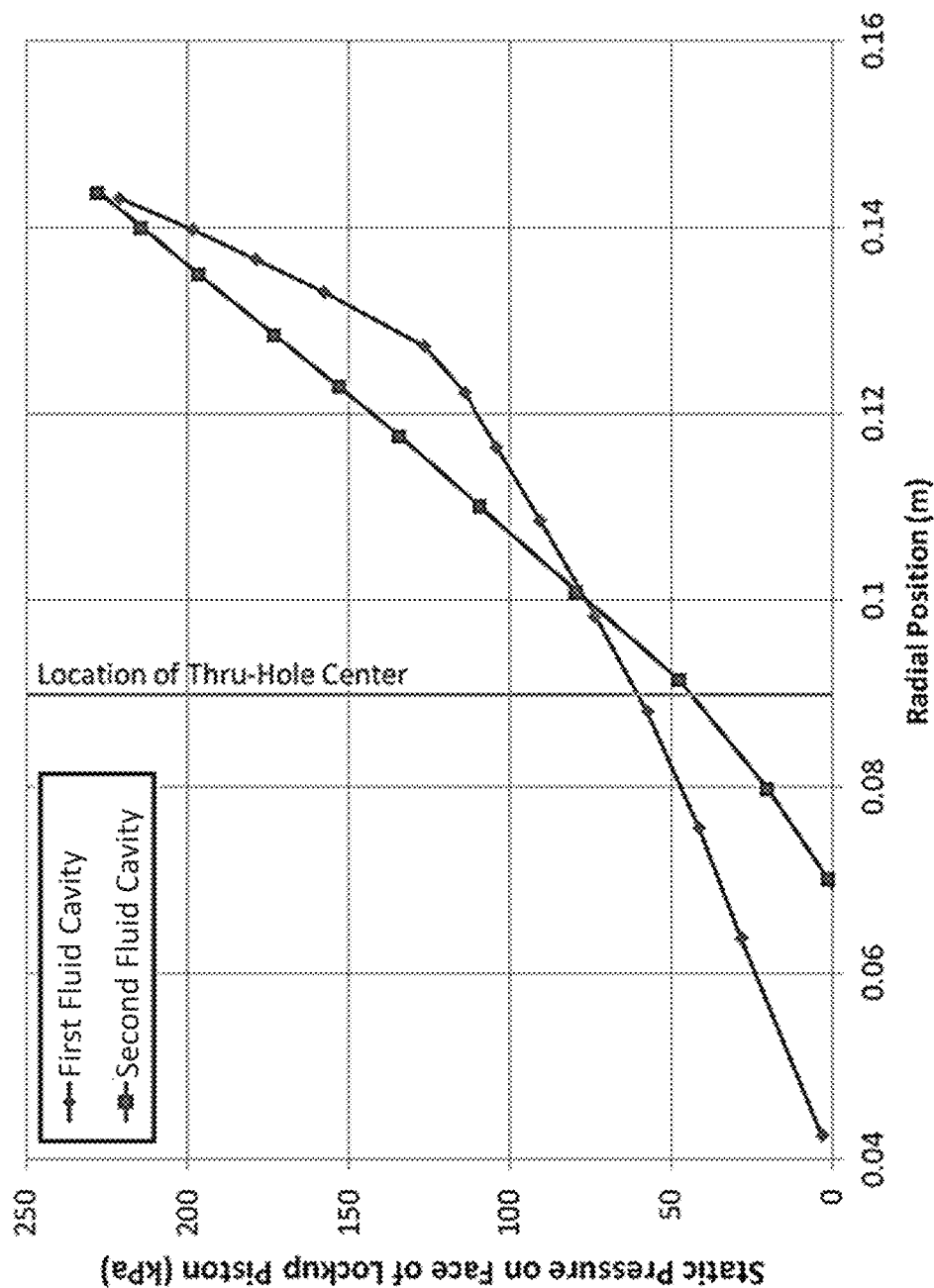

As shown in FIGS. 9 and 10, a second piston was subjected to a similar overrun simulation. The second piston included twelve one-way passageways, with each passageway having a diameter of 4.25 mm and a radial position of 0.09 m. In a radially outward direction, the resistance pressure in the first fluid cavity and the application pressure in the second fluid cavity both increased due to centrifugal forces. At close radial positions of 0.1 m and less, the resistance pressure in the first fluid cavity exceeded the application pressure in the second fluid cavity. However, at radial positions beyond 0.1 m, the one-way passageways allowed the resistance pressure in the first fluid cavity to drop below the application pressure in the second fluid cavity. Overall, there was about 150 N of net force on the piston applying the lockup clutch assembly. Thus, the one-way passageways are capable of reversing the direction of force on the piston to facilitate application of the lockup clutch assembly.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A torque converter configured to couple a prime mover to a transmission, the torque converter comprising:
   a pump;
   a turbine; and
   a lockup clutch assembly configured to selectively couple the pump and the turbine, the lockup clutch assembly comprising:
      a clutch;
      a piston with a first side configured to engage the clutch and an opposing second side, the first side of the piston facing a first fluid cavity and the second side of the piston facing a second fluid cavity;
      a first fluid passageway configured to permit a first fluid flow from the first fluid cavity to the second fluid cavity when the piston is disengaged from the clutch and block the first fluid flow when the piston is engaged with the clutch; and
      a second fluid passageway between the first fluid cavity and the second fluid cavity, wherein the fluid passageway is a one-way passageway that permits a second fluid flow from the first fluid cavity to the second fluid cavity and blocks the second fluid flow from the second fluid cavity to the first fluid cavity, the second fluid passageway including a one-way valve configured to engage a valve seat positioned within the second fluid passageway.

2. The torque converter of claim 1, wherein the piston has an inner diameter and an outer diameter, and the second fluid passageway is formed through the piston between the inner diameter and the outer diameter.

3. The torque converter of claim 1, wherein the second fluid passageway is located radially outward from an axis of rotation of the torque converter and radially inward from the clutch.

4. The torque converter of claim 1, wherein the piston comprises an inner rim and an outer clutch face configured to engage the clutch, and the second fluid passageway is located between the inner rim and the outer clutch face.

5. The torque converter of claim 1, wherein the one-way valve opens when the pressure in the first fluid cavity exceeds the pressure in the second fluid cavity and closes when the pressure in the second fluid cavity exceeds the pressure in the first fluid cavity.

6. The torque converter of claim 1, wherein the first side of the piston faces the prime mover and the second side of the piston faces the transmission.

7. The torque converter of claim 1, further comprising a damper assembly disposed axially between the turbine and the lockup clutch assembly.

8. The torque converter of claim 1, wherein the lockup clutch assembly is operable in:
   a converter mode in which fluid is introduced to the first fluid cavity to move the piston away from the clutch, and the fluid flows from the first fluid cavity to the second fluid cavity via the first fluid passageway; and
   a lockup mode in which fluid flows from the first fluid cavity to the second fluid cavity via the second fluid passageway.

9. The torque converter of claim 8, wherein the fluid travels axially rearward through the second fluid passageway and additional fluid is introduced to the second fluid cavity to move the piston axially forward toward the clutch in the lockup mode.

10. The torque converter of claim 1, wherein fluid in the first fluid cavity rotates with the turbine and fluid in the second fluid cavity rotates with the pump.

11. A torque converter configured to couple a prime mover to a transmission, the torque converter having an axis of rotation and comprising:
- a pump;
- a turbine; and
- a lockup clutch assembly configured to selectively couple the pump and the turbine, the lockup clutch assembly comprising:
    - a clutch;
    - a piston moveable in a first direction away from the clutch and a second direction toward the clutch;
    - a first fluid passageway configured to permit a first fluid flow from the first fluid cavity to the second fluid cavity when the piston is disengaged from the clutch and block the first fluid flow when the piston is engaged with the clutch; and
    - a second fluid passageway that is capable of opening to permit a second fluid flow in the first direction when the piston moves in the second direction, the second fluid passageway including a one-way valve configured to engage a valve seat positioned within the second fluid passageway.

12. The torque converter of claim 11, wherein the second fluid passageway extends through the piston.

13. The torque converter of claim 11, wherein the second fluid passageway of the lockup clutch assembly includes a plurality of fluid passageways arranged about the axis of rotation.

14. The torque converter of claim 11, wherein the second fluid passageway is substantially parallel to the axis of rotation.

15. The torque converter of claim 11, wherein the second fluid passageway closes to block fluid flow in the second direction.

16. The torque converter of claim 11, wherein the first direction is toward the transmission and the second direction is toward the prime mover.

17. A method of operating a lockup clutch assembly of a torque converter, the lockup clutch assembly including a clutch and a piston, the method comprising:
- moving the piston away from the clutch by introducing a first fluid flow to a first fluid cavity on a first side of the piston, the first fluid flow passing from the first fluid cavity to a second fluid cavity on a second side of the piston via a first fluid passageway; and
- moving the piston toward the clutch by introducing fluid to the second fluid cavity and opening a second fluid passageway from the first fluid cavity to the second fluid cavity, the second fluid passageway opening by disengaging a one-way valve from a valve seat positioned within the at least one fluid passageway, the first fluid passageway closing when the second fluid passageway opens.

18. The method of claim 17, wherein opening the second fluid passageway occurs during an overrun condition when fluid in the first fluid cavity is rotating faster than fluid in the second fluid cavity.

19. The method of claim 17, further comprising closing the second fluid passageway when the pressure in the second fluid cavity exceeds the pressure in the first fluid cavity.

20. A torque converter configured to couple a prime mover to a transmission, the torque converter comprising:
- a first rotatable assembly including a pump, the first rotatable assembly adapted to be coupled to the prime mover;
- a second rotatable assembly including a turbine, the second rotatable assembly adapted to be coupled to the transmission; and
- a lockup clutch assembly having a first sub-assembly carried by one of the first rotatable assembly and the second rotatable assembly and a second sub-assembly carried by the other of the first rotatable assembly and the second rotatable assembly, the lockup clutch assembly having a first configuration wherein the first sub-assembly is disengaged from the second subassembly and a second configuration wherein the first sub-assembly is engaged with the second sub-assembly;
- the first sub-assembly including a clutch and the second sub-assembly including a piston arranged to permit a first fluid flow from the first fluid cavity to the second fluid cavity via a first fluid flow path in the first configuration of the lockup clutch assembly, the piston further including a one-way passageway providing a second fluid flow path to selectively permit a second fluid flow from a first side of the second sub-assembly to a second side of the second sub-assembly in the second configuration of the lockup clutch assembly, the one-way passageway having a one-way valve configured to engage a valve seat positioned within the one-way passageway.

21. The torque converter of claim 20, wherein the piston is carried by the first rotatable assembly and the clutch is carried by the second rotatable assembly.

22. The torque converter of claim 20, wherein the one-way passageway extends through the piston.

* * * * *